United States Patent
Dmytrow et al.

(10) Patent No.: US 10,443,479 B2
(45) Date of Patent: Oct. 15, 2019

(54) EXHAUST CONTROL SYSTEM

(71) Applicant: Roush Enterprises, Inc., Livonia, MI (US)

(72) Inventors: Erin M. Dmytrow, Livonia, MI (US); Ryan L. Martin, Livonia, MI (US); Justin G. Schroeder, Livonia, MI (US)

(73) Assignee: Roush Enterprises, Inc., Livonia, MI (US)

( * ) Notice: Subject to any disclaimer, the term of this patent is extended or adjusted under 35 U.S.C. 154(b) by 0 days.

(21) Appl. No.: 14/797,791

(22) Filed: Jul. 13, 2015

(65) Prior Publication Data
US 2016/0123210 A1    May 5, 2016

Related U.S. Application Data

(60) Provisional application No. 62/072,582, filed on Oct. 30, 2014.

(51) Int. Cl.
*F01N 13/08* (2010.01)
*F01N 1/00* (2006.01)
(Continued)

(52) U.S. Cl.
CPC ............ *F01N 13/087* (2013.01); *F01N 1/00* (2013.01); *F01N 1/168* (2013.01); *F01N 9/00* (2013.01);
(Continued)

(58) Field of Classification Search
CPC .......... F01N 1/00; F01N 1/168; F01N 13/087; F01N 9/00; F01N 2240/36; F01N 2410/10
See application file for complete search history.

(56) References Cited

U.S. PATENT DOCUMENTS

| | | | |
|---|---|---|---|
| 4,779,705 A | 10/1988 | Verdin | 181/236 |
| 4,913,260 A | 4/1990 | Fallon | 181/254 |

(Continued)

FOREIGN PATENT DOCUMENTS

| | | |
|---|---|---|
| DE | 10 2005 029 763 | 12/2006 |
| DE | 10 2012 200 456 | 7/2013 |

(Continued)

OTHER PUBLICATIONS

International Searching Authority, International Search Report—International Application No. PCT/US2015/057972, dated Jan. 18, 2016, together with the Written Opinion of the International Searching Authority, 12 pages.

*Primary Examiner* — Phutthiwat Wongwian
*Assistant Examiner* — Matthew T Largi
(74) *Attorney, Agent, or Firm* — Nutter McClennen & Fish LLP (57) ABSTRACT

An exhaust management system for use in a motor vehicle having a muffler and a combustion engine generating an exhaust also has a bypass channel configured to be mounted to bypass the muffler of the exhaust system. The system also has a valve controlling air flow through the bypass channel, and a controller operably coupled with the valve. The controller is configured to be switchable between at least two modes. The at least two modes include a provider dynamic mode configured to be modified by a provider only, and a user dynamic mode configured to be modified by a user. The user has no rights to modify the provider dynamic mode.

34 Claims, 7 Drawing Sheets

(51) Int. Cl.
*F01N 9/00* (2006.01)
*F01N 1/16* (2006.01)

(52) U.S. Cl.
CPC ...... *F01N 2240/36* (2013.01); *F01N 2410/10* (2013.01); *Y02T 10/47* (2013.01)

(56) References Cited

U.S. PATENT DOCUMENTS

| | | | |
|---|---|---|---|
| 5,014,817 A | 5/1991 | Takato et al. | 181/254 |
| 5,271,224 A | 12/1993 | Cruickshank | 60/314 |
| 5,388,408 A | 2/1995 | Lawrence | 60/324 |
| 5,723,829 A | 3/1998 | Inomata et al. | 181/254 |
| 5,959,263 A | 9/1999 | Foltz, Jr. | 181/254 |
| 6,102,154 A | 8/2000 | Liu et al. | 181/265 |
| 6,178,745 B1 | 1/2001 | Meusen | 60/312 |
| 6,546,722 B2 | 4/2003 | Sagara et al. | 60/324 |
| 6,584,767 B1* | 7/2003 | Koenig | F01N 13/087 137/595 |
| 6,598,390 B2* | 7/2003 | Chang | F01N 1/006 181/227 |
| 6,612,400 B2 | 9/2003 | Bravo | 181/254 |
| 6,633,646 B1 | 10/2003 | Hwang | 381/71.5 |
| 6,662,554 B2 | 12/2003 | Sheidler et al. | 60/290 |
| 6,755,279 B2 | 6/2004 | Kaneko et al. | 181/232 |
| 6,760,659 B1* | 7/2004 | Cowen | F02D 41/2422 700/287 |
| 6,938,729 B2 | 9/2005 | Wörner et al. | 181/254 |
| 7,040,451 B2 | 5/2006 | Schumacher et al. | 181/254 |
| 7,337,609 B2 | 3/2008 | Mahnken et al. | 60/297 |
| 7,380,638 B2 | 6/2008 | Willey | 181/254 |
| 7,510,051 B2* | 3/2009 | Schrandt | F01N 1/08 180/219 |
| 7,527,126 B2 | 5/2009 | Kuroda et al. | 181/254 |
| 7,686,130 B1 | 3/2010 | Quaglia | 181/226 |
| 7,703,574 B2 | 4/2010 | Krüger et al. | 181/254 |
| 8,384,528 B2 | 2/2013 | McCarthy et al. | 340/384.3 |
| 8,413,428 B2 | 4/2013 | Devismes | 60/288 |
| 8,469,142 B2 | 6/2013 | Feng | 181/254 |
| 8,776,504 B2 | 7/2014 | Kleinfeld | 60/295 |
| 8,857,561 B2 | 10/2014 | Abram et al. | 181/254 |
| 2002/0010541 A1* | 1/2002 | Houston | F02D 37/02 701/115 |
| 2006/0173593 A1* | 8/2006 | Anderson | G01C 21/3461 701/36 |
| 2006/0292974 A1* | 12/2006 | Schorn | F01N 1/166 454/63 |
| 2007/0246295 A1 | 10/2007 | Aso | 181/256 |
| 2008/0023264 A1 | 1/2008 | Pacini et al. | 181/237 |
| 2008/0078613 A1 | 4/2008 | Liu | 181/237 |
| 2008/0245605 A1 | 10/2008 | Maeda et al. | 181/254 |
| 2009/0211841 A1 | 8/2009 | Bagheri | 181/241 |
| 2009/0229913 A1 | 9/2009 | Tonietto et al. | 181/254 |
| 2010/0307864 A1 | 12/2010 | Bohata | 181/254 |
| 2011/0053572 A1* | 3/2011 | Cook | H04M 1/72577 455/414.2 |
| 2011/0061969 A1 | 3/2011 | Hill et al. | 181/239 |
| 2011/0093149 A1* | 4/2011 | Tanaka | B60Q 5/008 701/22 |
| 2011/0099989 A1* | 5/2011 | Prior | F01N 3/043 60/320 |
| 2011/0197572 A1 | 8/2011 | Chang | 60/324 |
| 2012/0181106 A1 | 7/2012 | Nottelman et al. | 181/228 |
| 2013/0186062 A1 | 7/2013 | Pommerer et al. | 60/273 |
| 2014/0069739 A1 | 3/2014 | Schorn et al. | 181/228 |
| 2014/0161671 A1 | 6/2014 | Cuellar et al. | 422/115 |

FOREIGN PATENT DOCUMENTS

| | | | | |
|---|---|---|---|---|
| DE | 102012200456 A1 * | 7/2013 | | F01N 1/166 |
| DE | 102012200456 A1 * | 7/2013 | | F01N 1/166 |
| EP | 1 867 844 A1 | 12/2007 | | |
| EP | 2 199 551 | 6/2010 | | |
| JP | 9-209739 A | 8/1997 | | |
| JP | 2005-325820 A | 11/2005 | | |
| WO | WO 2012/030222 A1 | 3/2012 | | |
| WO | WO 2013/112101 A1 | 8/2013 | | |

* cited by examiner

| | ☐ Auto | | | | | | | | | | | | | | | | ☐ Custom | | | | | ← 29/31/34 |
|---|---|---|---|---|---|---|---|---|---|---|---|---|---|---|---|---|---|---|---|---|---|---|
| | 0 | 10 | 20 | 30 | 40 | 50 | 60 | 70 | 80 | 90 | 100 | 110 | 120 | 130 | 140 | 150 | 160 |
| 0 | 5 | 95 | 95 | 95 | 95 | 95 | 95 | 95 | 95 | 95 | 95 | 5 | 5 | 5 | 5 | 5 | 5 |
| 5 | 5 | 95 | 95 | 95 | 95 | 95 | 95 | 95 | 95 | 95 | 95 | 5 | 5 | 5 | 5 | 5 | 5 |
| 10 | 5 | 95 | 95 | 95 | 95 | 95 | 95 | 95 | 95 | 95 | 95 | 5 | 5 | 5 | 5 | 5 | 5 |
| 15 | 5 | 95 | 95 | 95 | 95 | 95 | 95 | 95 | 95 | 95 | 95 | 5 | 5 | 5 | 5 | 5 | 5 |
| 20 | 5 | 95 | 95 | 95 | 95 | 95 | 95 | 95 | 95 | 95 | 95 | 5 | 5 | 5 | 5 | 5 | 5 |
| 25 | 5 | 95 | 95 | 95 | 95 | 95 | 95 | 95 | 95 | 95 | 95 | 5 | 5 | 5 | 5 | 5 | 5 |
| 30 | 5 | 95 | 95 | 95 | 95 | 95 | 95 | 95 | 95 | 95 | 5 | 5 | 5 | 5 | 5 | 5 | 5 |
| 35 | 5 | 5 | 5 | 5 | 5 | 5 | 5 | 5 | 5 | 5 | 5 | 5 | 5 | 5 | 5 | 5 | 5 |
| 40 | 5 | 5 | 5 | 5 | 5 | 5 | 5 | 5 | 5 | 5 | 5 | 5 | 5 | 5 | 5 | 5 | 5 |
| 45 | 5 | 5 | 5 | 5 | 5 | 5 | 5 | 5 | 5 | 5 | 5 | 5 | 5 | 5 | 5 | 5 | 5 |
| 50 | 5 | 5 | 5 | 5 | 5 | 5 | 5 | 5 | 5 | 5 | 5 | 5 | 5 | 5 | 5 | 5 | 5 |
| 55 | 5 | 5 | 5 | 5 | 5 | 5 | 5 | 5 | 5 | 5 | 5 | 5 | 5 | 5 | 5 | 5 | 5 |
| 60 | 5 | 5 | 5 | 95 | 95 | 95 | 95 | 5 | 5 | 5 | 5 | 5 | 5 | 5 | 5 | 5 | 5 |
| 65 | 5 | 5 | 95 | 95 | 95 | 95 | 95 | 5 | 5 | 5 | 5 | 5 | 5 | 5 | 5 | 5 | 5 |
| 70 | 5 | 5 | 95 | 95 | 95 | 95 | 95 | 5 | 5 | 5 | 5 | 5 | 5 | 5 | 5 | 5 | 5 |
| 75 | 5 | 5 | 95 | 95 | 95 | 95 | 95 | 5 | 5 | 5 | 5 | 5 | 5 | 5 | 5 | 5 | 5 |
| 80 | 5 | 5 | 95 | 95 | 95 | 95 | 95 | 5 | 5 | 5 | 5 | 5 | 5 | 5 | 5 | 5 | 5 |
| 85 | 5 | 5 | 95 | 95 | 95 | 95 | 95 | 5 | 5 | 5 | 5 | 5 | 5 | 5 | 5 | 5 | 5 |
| 90 | 5 | 5 | 95 | 95 | 95 | 95 | 95 | 5 | 5 | 5 | 5 | 5 | 5 | 5 | 5 | 5 | 5 |
| 95 | 5 | 5 | 95 | 95 | 95 | 95 | 95 | 5 | 5 | 5 | 5 | 5 | 5 | 5 | 5 | 5 | 5 |
| 100 | 5 | 5 | 95 | 95 | 95 | 95 | 95 | 5 | 5 | 5 | 5 | 5 | 5 | 5 | 5 | 5 | 5 |

EXHAUST CONTROL SYSTEM

PRIORITY

This patent application claims priority from Provisional U.S. Patent Application No. 62/072,582, filed Oct. 30, 2014, entitled, "EXHAUST CONTROL SYSTEM," and naming Erin M. Dmytrow, Ryan L. Martin, and Justin G. Schroeder as inventors, the disclosure of which is incorporated herein, in its entirety, by reference.

FIELD OF THE INVENTION

The invention generally relates to automobile exhaust systems and, more particularly, the invention relates to controlling the sound of automobile exhaust systems.

BACKGROUND OF THE INVENTION

Automobiles have exhaust systems to guide exhaust gasses away from the controlled combustion taking place inside their engines. In addition to exhausting gasses, automobile exhaust systems also control engine noise. Specifically, much of the engine noise produced by the internal combustion process emanates through the exhaust system. In fact, that noise can be quite loud and, consequently, disturbing to the driver and people near the driver. Exhaust systems therefore typically have a muffler system to reduce that engine noise. The mufflers often are configured to mitigate the noise to levels defined by state and local noise regulations.

Sports car and sport truck enthusiasts, however, may prefer to hear the full sound of their engines. For example, sports car enthusiasts often prefer to hear the "rumble" of their engines when riding their sports cars on a closed track. Indeed, the muffler function often is not legally necessary on a track in this instance since tracks generally are not subject to the municipal noise regulations. Some tracks, however, are subject to noise regulations and thus, also still must be muffled to some extent to comply with the noise regulations.

SUMMARY OF VARIOUS EMBODIMENTS

In accordance with one embodiment of the invention, an exhaust management system for use in a motor vehicle having a muffler and a combustion engine generating an exhaust has a bypass channel configured to be mounted to bypass the muffler of the exhaust system. In addition, the system also has a valve configured for controlling air flow through the bypass channel, and a controller operably coupled with the valve. The controller is configured to be switchable between at least two modes. Specifically, the at least to modes may include a static mode that controls valve movement in response to user selection and independently of any dynamic parameters of the motor vehicle, and a dynamic mode in which the valve is movable in response to at least one dynamic parameter of the motor vehicle. The controller is configured to control the movement of the valve about a plurality of positions between an open mode and a closed mode as a function of the at least one dynamic parameter of the motor vehicle when in the dynamic mode. In addition, the controller is configured to permit the valve to be in a position that is at least partly open at certain times when in the dynamic mode.

The at least one dynamic parameter can vary during operation of the motor vehicle. The system also may have a switch (operably coupled with the controller) that is alternatively switchable between the static mode and the dynamic mode. Moreover, memory may store dynamic valve positional information relating to the dynamic mode. In that case, the system further may include code for generating a graphical user interface (operably coupled with the controller) configured to change the dynamic valve positional information stored in the memory.

The vehicle preferably has a throttle and is configured to operate at a plurality of speeds. In that case, the at least one dynamic parameter may include at least one of the throttle position of the vehicle and the speed of the motor vehicle. The dynamic mode may have two sub-modes: 1) a provider dynamic mode configured to be modified by a provider modality only, and/or 2) a user dynamic mode configured to be modified by a user modality, which is unable to modify the provider dynamic mode.

Like many other motor vehicles, this motor vehicle may have a transmission system. In that case, the at least one dynamic parameter may include at least one of throttle position, speed of the vehicle, load on the vehicle engine, RPM of the engine, gear of the transmission system, the position of the vehicle in its environment, and the local time. Some embodiments configure the controller to access a look-up-table when in the dynamic mode. In that case, the controller uses the at least one dynamic parameter to determine a valve setting when in the dynamic mode, and the controller controls the valve based on the valve setting.

A number of modalities may control the valve. For example, the controller may be configured to transmit, when in the dynamic mode, a pulse width modulated signal to the valve after receiving information relating to the at least one dynamic parameter.

In accordance with another embodiment, an exhaust management kit for use in a motor vehicle having a muffler and a combustion engine generating an exhaust has a bypass channel configured to be mounted to bypass the muffler of the exhaust system. The kit also has a valve controlling air flow through the bypass channel when connected with the muffler, and a controller configured to be switchable between at least two modes. Those at least two modes include 1) a static mode that controls valve movement in response to user selection and independently of any dynamic parameters of the motor vehicle, and 2) a dynamic mode in which the valve is movable in response to at least one dynamic parameter of the motor vehicle. When connected, the controller is configured to control the movement of the valve between a plurality of positions between the open mode and closed mode as a function of the at least one dynamic parameter of the motor vehicle when in the dynamic mode. In that state and when in the dynamic mode, the controller is configured to permit the valve to be in a position that is at least partly open at certain times.

In other embodiments, an exhaust management system for use in a motor vehicle having a muffler and a combustion engine generating an exhaust also has a bypass channel configured to be mounted to bypass the muffler of the exhaust system. The system also has a valve controlling air flow through the bypass channel, and a controller operably coupled with the valve. The controller is configured to be switchable between at least two modes. The at least two modes include a provider dynamic mode configured to be modified by a provider class of people only, and a user dynamic mode configured to be modified by a user class of people. The user class has no rights to modify the provider dynamic mode.

The provider and user dynamic modes are configured to control movement of the valve in response to at least one dynamic parameter of the motor vehicle. In addition, the controller is configured to control the movement of the valve across a plurality of positions between the open mode and closed mode as a function of the at least one dynamic parameter of the motor vehicle when in the provider or user dynamic modes. Specifically, the controller is configured to permit the valve to be in a position that is at least partly open at certain times when in the dynamic mode.

In accordance with still other embodiments of the invention, an exhaust management system (e.g., an "active" exhaust system) for use in an automobile having a muffler has a bypass channel configured to be mounted to bypass the muffler of the exhaust system, and a valve (e.g., internal or external to the channel) controlling air flow through the bypass channel. The system also has a controller operably coupled with the valve. The controller is configured to receive information relating to at least one dynamic parameter of the automobile. In addition, the controller is configured to control the operation of the valve as a function of the at least one dynamic parameter of the automobile.

Illustrative embodiments of the invention are implemented as a computer program product having a computer usable medium with computer readable program code thereon. The computer readable code may be read and utilized by a computer system, including mobile devices, such as mobile telephones, smartphones, tablets, smartwatches, etc., in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an automobile or other motorized vehicle has a switch that enables a user to easily control the engine sound of their vehicle. To that end, the vehicle has a controller that selectively bypasses exhaust flow around the muffler function of the exhaust system. A user can select between at least two modes of such an operation: a static mode that controls exhaust flow direction independently of dynamic parameters of the vehicle, or a dynamic mode that controls exhaust flow direction as a function of the dynamic parameters of the vehicle. Among other things, the dynamic parameters may include the accelerator pedal (also referred to as the "throttle position") and/or speed of the vehicle.

Some embodiments even have two types of dynamic modes: a first dynamic mode in which only a technician or other equipment supplier can adjust the exhaust sound in response to the dynamic parameters, and a second dynamic mode in which a user or other person authorized by the user (hereinafter "user") can adjust the exhaust response to the dynamic parameters (e.g., using an intuitive user interface). Accordingly, the user can effectively control the decibel level and sound produced by the automobile in the second dynamic mode. Unlike the second dynamic mode, however, the user cannot adjust the exhaust response of the first dynamic mode. Details are discussed below.

Figure 1:
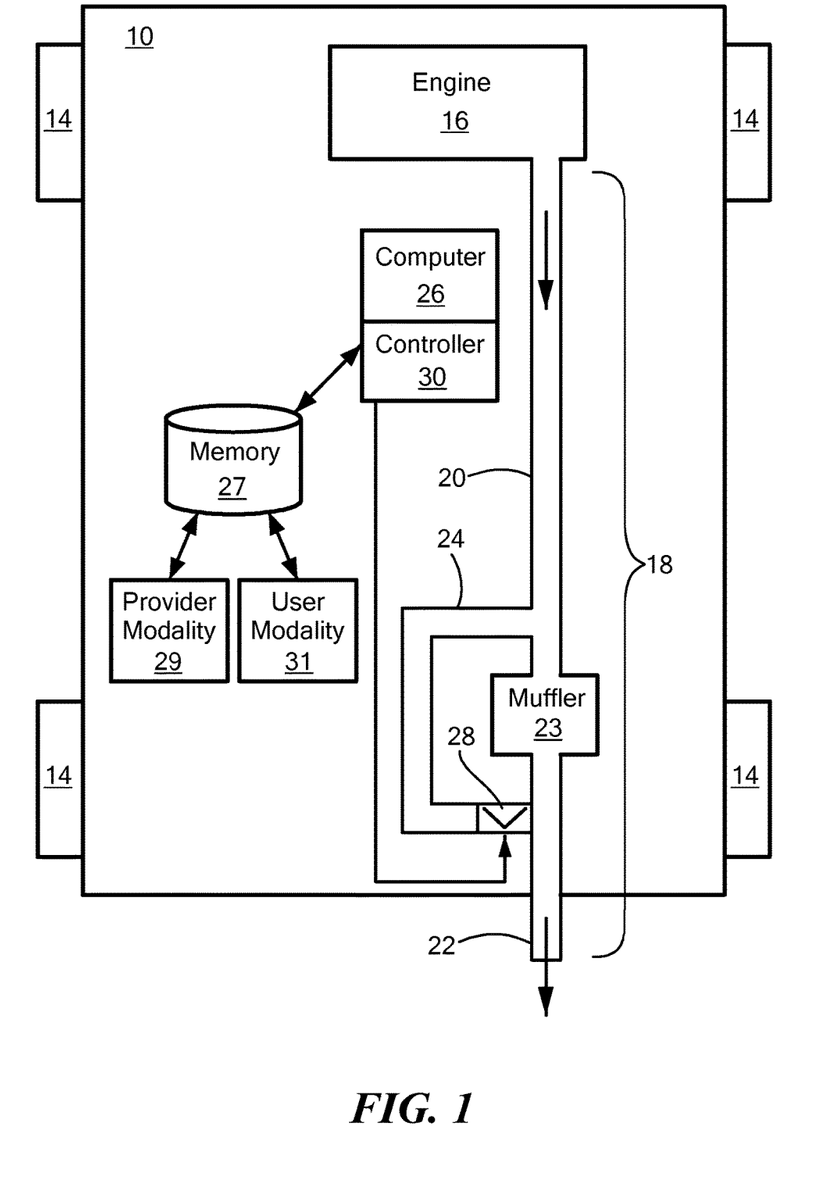
FIG. 1 schematically shows an automobile configured in accordance with illustrative embodiments of the invention.

FIG. 1 schematically shows a motor vehicle configured in accordance with illustrative embodiments of the invention. In this case, the vehicle is an automobile and identified by reference number 10. Like many other modern automobiles, the automobile 10 shown in FIG. 1 has a body 12 that supports a number of important components, such as, among other things, four wheels 14, an engine 16 for power (e.g., an internal combustion engine powered by gasoline, alternative fuel, or diesel), and an exhaust system 18 for expelling exhaust gas produced by the combustion process of the engine 16. As shown, the exhaust system 18 generally has a main pipe 20 terminating at a tail pipe 22 that is exposed to the environment. As known by those in the art, much of the noise produced by the engine 16 generally is transmitted to the external environment through the exhaust system 18. Accordingly, the main pipe 20 also has a muffler 23 to mitigate that noise.

The automobile 10 also has a central computer 26 that controls many automobile systems, such as, among other things, the safety system (e.g., traction control and airbag safety), emission control, the ignition system, and the general operation of the automobile 10. Indeed, mention of these computer functions is merely illustrative of but a few of the many different functions performed by the central computer 26. Accordingly, discussion of such functions is for descriptive purposes only and not intended to limit various embodiments of the invention. Those skilled in the art understand the many functions of the central computer 26.

The inventors believe that some drivers prefer to have more control of the noise level and sound of their automobiles 10. For example, drivers of high performance sports cars, such as the popular Ford Mustang™ (distributed by Ford Motor Company), may prefer to hear the "rumble" of the engine 16 when they rapidly accelerate. The inventors consequently modified the exhaust system 18 to give drivers that ability.

To that end, the exhaust system 18 also has a bypass channel 24 that directs exhaust gasses around the muffler 23 (i.e., around at least the noise reduction portion of the muffler 23) to terminate at the noted tail pipe 22, which can be positioned at the rear, side, or other location of the automobile 10. Among other ways, the bypass channel 24 can be implemented as a tube having an open bore (e.g., a pipe) coupled both 1) upstream of the muffler 23 and 2) downstream of the muffler 23. In some embodiments, however, the bypass channel 24 terminates at a separate tail pipe 22 at the rear, side, or other location on the automobile 10. In either case, the exhaust system 18 also has one or more control valve(s) 28 (hereinafter "valve 28") that control the amount of exhaust gas bypassing the muffler 23 through the bypass channel 24. The control valve 28 is positioned so that it can selectively occlude gas flow through the bypass channel 24. The control valve 28 thus can be positioned at one or more of the intersections of the main pipe 20 and the bypass channel 24, and/or inside the bypass channel 24.

The automobile 10 also has memory 27 for storing various parameters that control valve position, and an associated provider modality 29 for enabling a provider to manage a prescribed set of those valve positional parameters. The automobile also has an associated user modality 31 for enabling a user to control another prescribed set of those valve positional parameters. The user modality 31 and provider modality 29 are not necessarily part of the automobile 10, but can be stand-alone modalities (e.g., an application executing on a remote computer system). Moreover, in some embodiments, the memory may include read/write memory, and/or read-only memory (e.g., the area storing parameters for the provider modality 29). Details of the two modalities and how they interact with the memory 27 are discussed below.

Alternative embodiments may position the control valve 28 in the main pipe 20 to selectively occlude exhaust flow through main pipe 20 having the muffler 23. Yet other embodiments may position the valve 28 to selectively occlude both the main pipe 20 and bypass channel 24 (with one or more valves 28). The discussion below, however, relates primarily to a valve arrangement that selectively occludes the bypass channel 24 without impeding flow through the main pipe 20.

Additional embodiments discussed below with regard to FIGS. 6-8 position the bypass channel 24 within the muffler housing, while still effectively bypassing the noise reduction portion of the muffler 23.

Accordingly, when the valve 28 within the bypass channel 24 (or at one of the mouths of the bypass channel 24) is fully closed, the exhaust gas of this embodiment passes through the muffler 23/exhaust system 18 as if the bypass channel 24 were effectively omitted from the fluid circuit. In contrast, when the valve 28 is fully open, exhaust gas may freely flow through both the bypass channel 24 and the main pipe 20/muffler 23. When the valve 28 shown is fully open, an additional valve 28 (not shown) may occlude air flow through the main pipe 20/muffler 23.

The valve 28 also may be partially open, thus providing a range of exhaust gas pressures that may traverse through the bypass channel 24 and the muffler 23. This range corresponds to a range of sounds and noise levels that may be produced by the engine 16. During testing, the inventors discovered that this range is not necessarily linear. Accordingly, the amount the valve 28 permits flow through the bypass channel 24 does not necessarily correspond to a precise, linear change in the noise and sound level.

The position of the valve 28 therefore controls the desired sound of the exhaust system 18. Illustrative embodiments thus carefully control the valve 28 using a separate valve controller 30 that receives input parameters from the central computer 26 (or other data source) and responsively controls the amount/pressure of exhaust gas that the valve 28 permits through the bypass channel 24. Those skilled in the art may use any of a variety of conventional technologies to implement the valve controller 30. For example, a conventional engine/electronic control module ("ECM," sometimes part of a larger engine/electronic control unit or "ECU") may be programmed to control the position of the valve 28. Other embodiments may use one or more microprocessors, digital signal processors, and/or other electronics to implement that valve controller 30.

Figure 2:
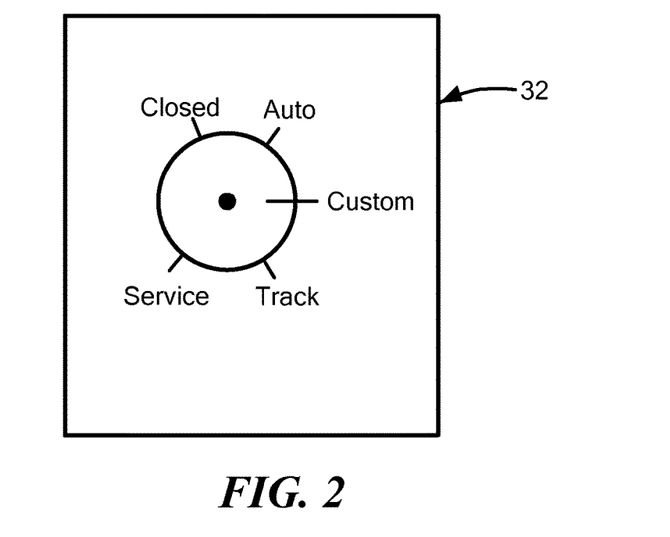
FIG. 2 schematically shows a switch a user may manipulate to implement illustrative embodiments of the invention.

The driver or other person inside the automobile 10 preferably can decide whether to set the automobile 10 to any of a plurality of different driving sounds. For example, FIG. 2 schematically shows a virtual or mechanical switch (e.g., a picture of such a switch 32 on an LCD touch-display screen, or a physical rotatable dial switch 32) that permits the user, while inside the automobile 10, to change between these modes. In illustrative embodiments, those modes may include:

Closed Mode: the valve 28 substantially completely closes the bypass channel 24. Accordingly, exhaust gas passes through the main pipe 20 and muffler 23 to the tail pipe 22.

Auto Mode: The valve 28 is dynamically opened, closed, or partially open depending on pre-configured parameters. These parameters may be pre-configured by a third party provider, such as an aftermarket dealer or technician, to be louder than it would be without the bypass channel 24, but close to the legal noise regulations (e.g., plus and/or minus some amount above and/or below the legal limits). Data controlling movement and position of the valve 28 is only accessible and modifiable by a provider of this equipment to the user. The user, in the role of the user, cannot change that data.

Custom Mode: The valve 28 is dynamically opened, closed, or partially open depending on pre-configured parameters. Unlike in the Auto Mode, however, the parameters may be pre-configured by the user or anyone with access to a modality that permits self-configuration (discussed below).

Track Mode: The valve 28 is substantially completely open, permitting maximum exhaust gas through the bypass channel 24. In this mode, the automobile 10 is likely to be at its loudest. This mode is called the "Track Mode" because it is likely to be used commonly when the automobile 10 is driven on an auto track.

Service Mode: The valve 28 is in a position required by some servicing protocol to service the system.

Figure 3:
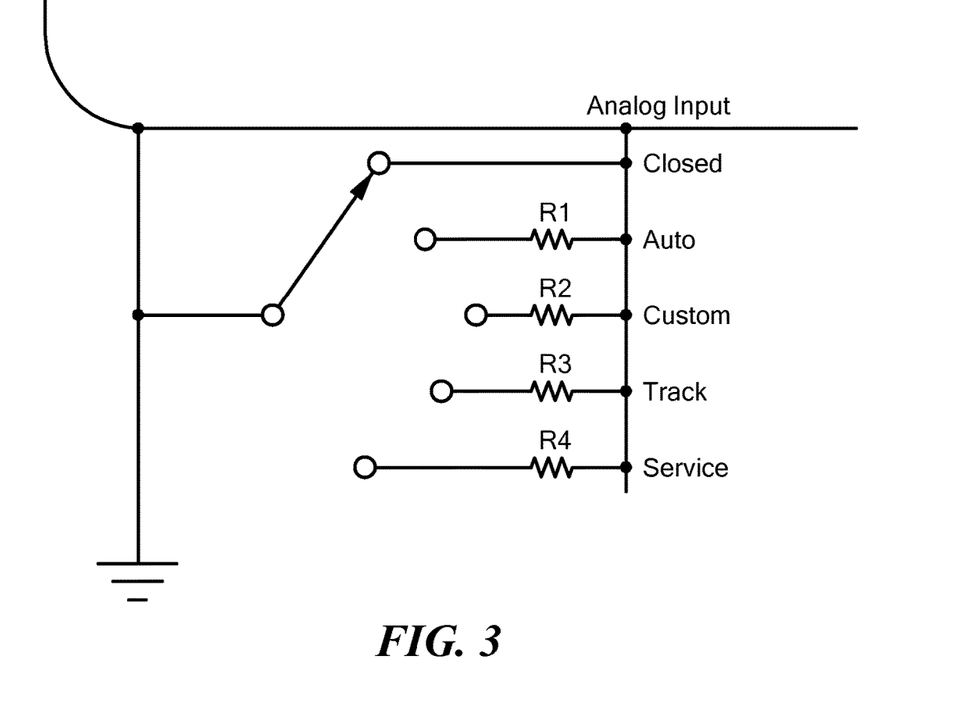
FIG. 3 schematically shows a high-level circuit diagram of the switch of FIG. 2.

FIG. 3 schematically shows a simplified circuit diagram of the switch 32, and some positions it can have relative to the noted modes. The resistors are selected to draw different currents toward the valve controller 30. For example, the resistor with the Auto Mode may be 250 ohms, the resistor for the Track Mode may be 750 ohms, and the resistor for the Custom Mode can be 10 kilo-ohms. The valve controller 30 detects the current drawn, which is based on the resistor value, to determine the appropriate mode of operation.

The Custom Mode and Auto Mode are considered to be "dynamic modes" because, when the valve controller 30 is in one of those modes, it controls movement of the valve 28 about a plurality of positions as a function of at least one dynamic parameter (e.g., accelerator pedal position, speed, and/or other parameters discussed herein). In contrast, the Track Mode and Closed Mode are considered to be "static modes" because, when the valve controller 30 is in one of those modes, it sets the valve 28 to a prescribed position independent of any dynamic parameter of the automobile 10. In other words, when the user selects a static mode, the valve 28 is set to a prescribed position that does not change in response to speed changes, throttle position changes, etc. Although not discussed above, other static modes may position the valve 28 in a partly open/closed position.

The dynamic mode referred to above as the "Custom Mode" may be considered to be a "user dynamic mode" because, as noted above, the user can modify the underlying data (discussed below) controlling valve position. To that end, the user may use the prior noted user modality 31 (FIG. 1), such as that discussed in greater detail below, to access the underlying data. The user modality 31 may require authentication information (e.g., password and/or login ID), or not require authentication (e.g., anyone sitting in the car or with a prescribed application may access the data).

As noted, the user preferably is the person or entity (e.g., a corporation) that owns the title (i.e., the "owner") to the automobile 10 after it is sold in any one or more of a plurality of conventional automobile 10 or vehicle transactions (e.g., a dealer to an individual, a corporation to another corporation, a corporation to an individual, an individual to another individual, etc.). The user is not necessarily a person or entity financing the automobile 10. The user also may be an agent of the owner. For example, the user may include a relative or friend driving the automobile 10 (with or without permission of the owner), or a person leasing or renting the automobile 10 from a dealership or car rental company. In some instances, a technician at an automobile repair shop also may be acting in the role of a user if the owner gives that person such rights, or if the technician also owns the automobile 10.

The dynamic mode referred to above as the "Auto Mode" may be considered to be a "provider dynamic mode" because it is controlled by an authorized provider of services for the equipment, or that entity's agent (also considered a provider). More specifically, as noted above, the underlying data controlling movement and position of the valve 28 in this mode are accessible and modifiable by a provider only. The user cannot change that data unless, for example, that user is acting in the capacity of a provider, such as if the provider owns the automobile 10. A person or other entity is considered to be a provider when they are implicitly or explicitly authorized to maintain the valve controller 30 or related equipment for the user. For example, among others, the provider may include an automobile dealer, an equipment supplier, a technician, a person and/or an after-market company that sells, installs, or services the equipment, or other party in a similar position. Other related examples include "Tier One," "Tier Two," or "Tier Three" companies and their respective employees or representatives in the automotive industry supply chain.

At least one of these providers has the prior noted provider modality 29 (FIG. 1) with authorization from a distributor or other responsible party to modify the underlying data of the provider dynamic mode, when necessary. For example, if the noise regulations change, the provider may provide an update to the underlying data to comply with the new regulations. This update may be performed in a variety of conventional manners, such as through a WIFI or a hard-wired update, or via a manual update with a technician entering the data through a conventional user interface (e.g., a graphical user interface on a desktop or other type of computer device; see FIG. 4, discussed below).

In some embodiments, a single modality, such as a single programmed hardware device, may have the capability of accessing both dynamic modes if certain authentication or control codes are authorized. For example, a technician may have such a device and enter a provider login code to access the data of the provider dynamic mode. A user may have the same device, but only have user authentication data, or the device may be programmed for the user dynamic mode only. Accordingly, such a user is not considered to have the provider modality 29 if that user has no rights to use the provider modality 29. Instead, such a user has the provider modality 29 only.

It should be noted that unauthorized people may be able to "hack" into the valve controller 30 (also referred to as "jailbreaking" the equipment) to alter the data of the provider dynamic mode. Hackers have been altering data in equipment for years. Accordingly, even if an unauthorized person or program could hack or otherwise access/change the data, the provider dynamic mode still is considered to be modifiable by the provider modality 29 only. For example, if an owner not authorized as a provider hacked into the valve controller 30 and changed the data of the provider dynamic mode, such an action would not be considered to change the nature of the provider dynamic mode. In that example, the owner/user would still not be considered to have access to the relevant data via another means other than the provider modality 29.

Indeed, some embodiments may use any of a variety of mechanical devices for switching between modes. The switch 32 of FIG. 2 provides a good example of one such device. Other embodiments may use pushbuttons for different modes similar to preselect buttons of a car radio. Those skilled in the art can select any of a variety of other mechanical or virtual switches. Rather than using the above noted switch 32 or other manual or mechanical device, such as that in FIG. 2, the system may be configured with voice recognition technology to change modes upon receipt of a voice command. The user also can control the system with voice-based system override commands, such as those discussed below. Accordingly, discussion of the switch 32 is illustrative of one embodiment, but not intended to limit various other embodiments.

The user can change underlying valve positional data of the user dynamic mode in any of a variety of manners. To that end, the user preferably enters the values of certain parameters and how much the valve 28 should be open during those times. For example, the user may program the valve controller 30 to open the valve 28 about 40 percent (of the full amount it can be opened) when it detects an automobile speed of 35 miles per hour. As another example, the user may program the valve controller 30 to open the valve 28 about 70 percent when it detects that the throttle is depressed 90 percent of its potential range.

Other embodiments may not be so simple. In particular, such embodiments may program the valve controller 30 to set the valve 28 to a specified position in response to receipt of two or more input parameters. This valve opening amount can be based on any of a variety of techniques, such as a simple look-up-table, or a formula that weights or does not weight the parameters. Among other things, illustrative embodiments may control valve position based on individual or combinations of any of the following parameters:

Speed,
Throttle position,
Engine load (i.e., how hard the engine 16 is working, such as whether it is forcing the car up a steep hill),
Revolutions per minute (RPM) of the engine 16,
Gear of the transmission system,
Environmental temperature,
Position via global positioning systems (e.g., close the valve 28 when in a residential neighborhood, but open the valve 28 when in a rural area,
Level of fuel in the automobile 10,
The local time where the automobile 10 is operating, and
Weather (e.g., if raining, sunny, windy, etc.).

Since some of these parameters may change while the automobile 10 is moving, such parameters are referred to as "dynamic variables." Moreover, it should be noted that this list is illustrative and not intended to be an exhaustive list of dynamic variables. Accordingly, those skilled in the art may use other dynamic variables to control output sound.

The user may use the user modality 31 to program the valve controller 30 using any of a variety of technologies. For example, the user may access a configuration module having an easy to follow graphical user interface for receiving commands and/or data. This configuration module may be implemented in any of a variety of technologies, such as a stand-alone hardware device with embedded software, enterprise software, home computer software, cloud software, or as an application (an "App") on a mobile computing device, such as a smartphone.

Figure 4:
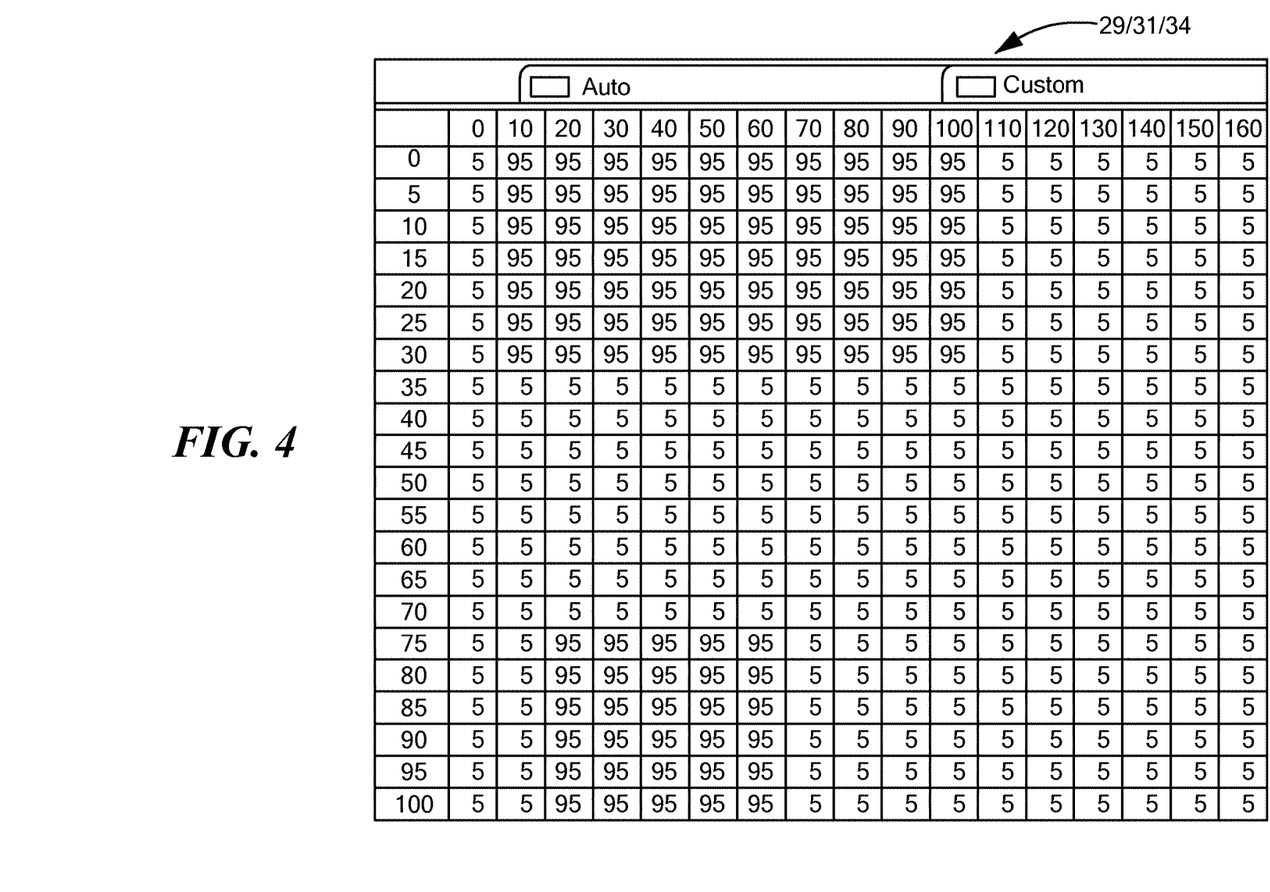
FIG. 4 graphically shows a look-up table that may implement illustrative embodiments of the invention.

The configuration module receives input from the user for storage in the memory 27 (FIG. 1) local to the valve controller 30. FIG. 4 schematically shows one embodiment of a graphical user interface for building a look-up-table 34 that the valve controller 30 accesses to set the valve position. As shown, the look-up table 34 has one tab for each mode—in this example, at least one tab is for the Custom Mode, while at least one other tab is for the Auto Mode. The Custom Mode and Auto Mode each may have some form of security/authentication protection known by the user (e.g., a password/ID and/or biometric authentication). In illustrative embodiments, however, both have different access codes. Specifically, the user has security information to access the Custom tab but not the Auto tab.

Conversely, the provider preferably has different security credentials for the Auto tab. As such, the user cannot modify the settings of the Auto tab, and the provider cannot modify the settings of the Custom tab. In some embodiments, however, the provider also has access to the Custom tab. In yet other embodiments, the User tab has no security. In any of those cases, despite the fact that the two tabs are arranged in the same manner, the two tabs are considered different modalities for accessing the underlying data controlling valve position.

Illustrative embodiments simply have this single modality for each mode. In other embodiments, each mode may have multiple different modalities. For example, the user modality 31 may include an application program that may access the memory 27 through a computer or smartphone, and a hard-wired console built into the dash of the car.

Each tab has a multi-dimensional look-up-table (e.g., a two-dimensional look-up-table). In this example, which sows the Custom tab, the row across the top of a tab represents the speed of the car, while the column at the far left represents the percentage the accelerator is depressed. Using this user configuration module, the user can edit this table 34 (i.e., the Custom tab) relatively easily by changing the values in this two dimensional table 34. Tables at other tabs, such as the tab for the Auto Mode, may be set to read-only mode, from the perspective of the user, to prevent user changes. In other embodiments, the Auto tab is not alterable by the provider—its data is fixed.

To determine the amount to open the valve 28, the valve controller 30 finds the appropriate cell when operating the automobile 10. For example, using the look-up-table 34 in FIG. 4, when driving 100 miles per hour and depressing the accelerator at 20 percent, the valve 28 should be set to be 95 percent open. Accordingly, the bypass channel 24 is receiving much of the exhaust gas/pressure, causing a louder noise output from the exhaust system 18. In contrast, at 100 miles per hour, when the accelerator is 35 percent depressed, the valve 28 is only open about 5 percent. Accordingly, most of the exhaust gas/pressure passes through the muffler portion of the exhaust system 18 and thus, is much quieter.

Again, as noted above, the interface of FIG. 4 is but one of a plurality of exemplary access modalities. Those skilled in the art can select other modalities or modalities that operate differently (e.g., using an equation) to modify the parameters. Moreover, the provider modality 29 can operate similarly or differently from the user modality 31.

Figure 5:
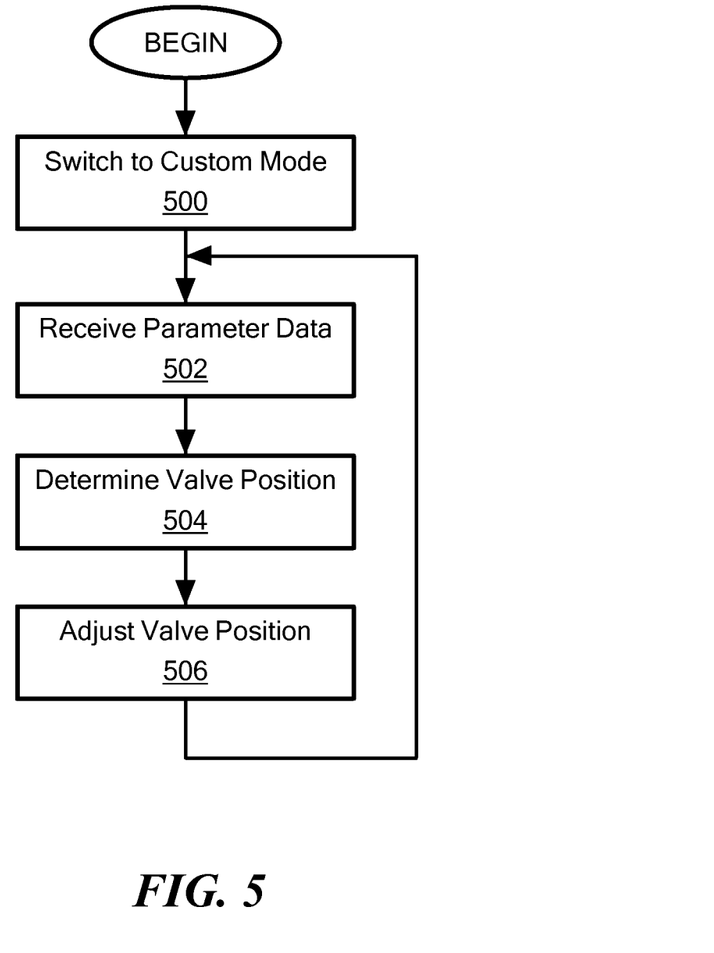
FIG. 5 shows a process of implementing a custom mode of operation in accordance with illustrative embodiments of the invention.

FIG. 5 shows a simplified process of controlling the output sound of the exhaust system 18 in accordance with illustrative embodiments of the invention. It should be noted that this process is substantially simplified from a longer process that may be used to control output sound. Accordingly, the actual process may have additional steps that those skilled in the art likely would use. In addition, some of the steps may be performed in a different order than that shown, or at the same time. Those skilled in the art therefore can modify the process as appropriate.

The process begins at step 500, in which the user switches the system to Custom Mode. For example, while within the automobile 10, the user may rotate the dial switch 32 of FIG. 2 to the "Custom" setting. Next, the valve controller 30 receives dynamic parameter data at step 502. For example, the valve controller 30 may receive the speed and throttle positions directly from the central computer 26.

After receiving the dynamic parameter data, the valve controller 30 determines the appropriate valve position (step 504). As noted above, the valve controller 30 can use any of a plurality of different ways to set the valve position based on the received dynamic parameters. Using the example of FIG. 4, the valve controller 30 may access the look-up-table 34 to determine the appropriate position of the valve 28. For example, if the automobile 10 has attained a speed of 10 miles per hour and the throttle is at 30 percent, then the valve controller 30 may set the valve 28 to about 95 percent open.

After it determines valve position, the valve controller 30 sends an electronic signal to the valve 28, causing it to open to the prescribed position (step 506). Continuing with the above example, the valve controller 30 may send a signal to the valve 28 so that it is open 95 percent, thus permitting a significant amount of the exhaust gas/pressure to traverse through the bypass channel 24. To that end, the valve controller 30 may cause transmission of a pulse width modulated signal to the valve 28, causing it to open an appropriate amount. Other embodiments may use other ways to open the valve 28 (e.g., vacuum or mechanical techniques).

This process executes rapidly because the automobile 10 may change speeds and throttle positions at a fast rate. Accordingly, the process loops back to step 502 to receive new parameter data.

Some embodiments have override modes that can override the Custom Mode and/or the other modes (e.g., the Auto Mode or a static mode). For example, illustrative embodiments may cause the valve controller 30 to prevent the system from using custom mode values between certain times of the day (e.g., between 5 am and 9 am on Sundays), or when the automobile 10 is physically in certain geographic areas (e.g., in a certain neighborhood as determined by GPS or other conventional means). Accordingly, despite the fact that the system is set to Custom Mode, if the system also is set to one or more override settings, then the Custom Mode may be disabled. These override modes may be activated as desired by the user, or hard-coded into the system. As another example, the system may automatically revert to a quiet mode upon receipt of a signal or message (e.g., a telephone call) by the automobile 10.

As noted, the exhaust system 18 of FIG. 1 is but one of a plurality of ways of implementing various embodiments.

Figure 6:
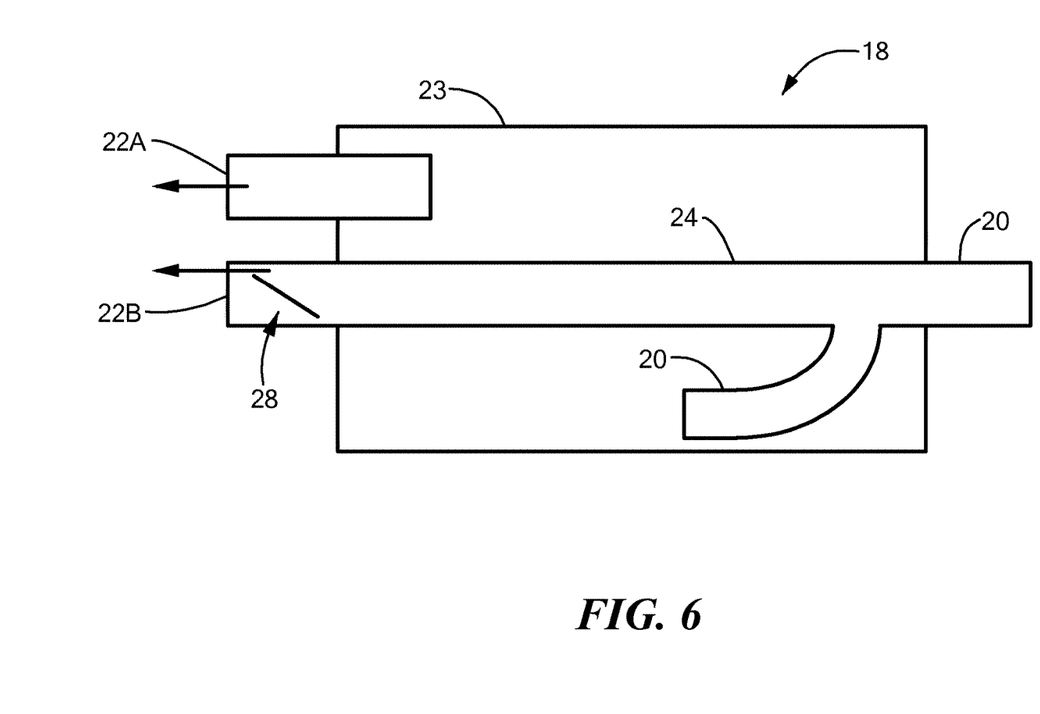
FIG. 6 schematically shows an exhaust system configured in accordance with another embodiment of the invention.
Figure 7:
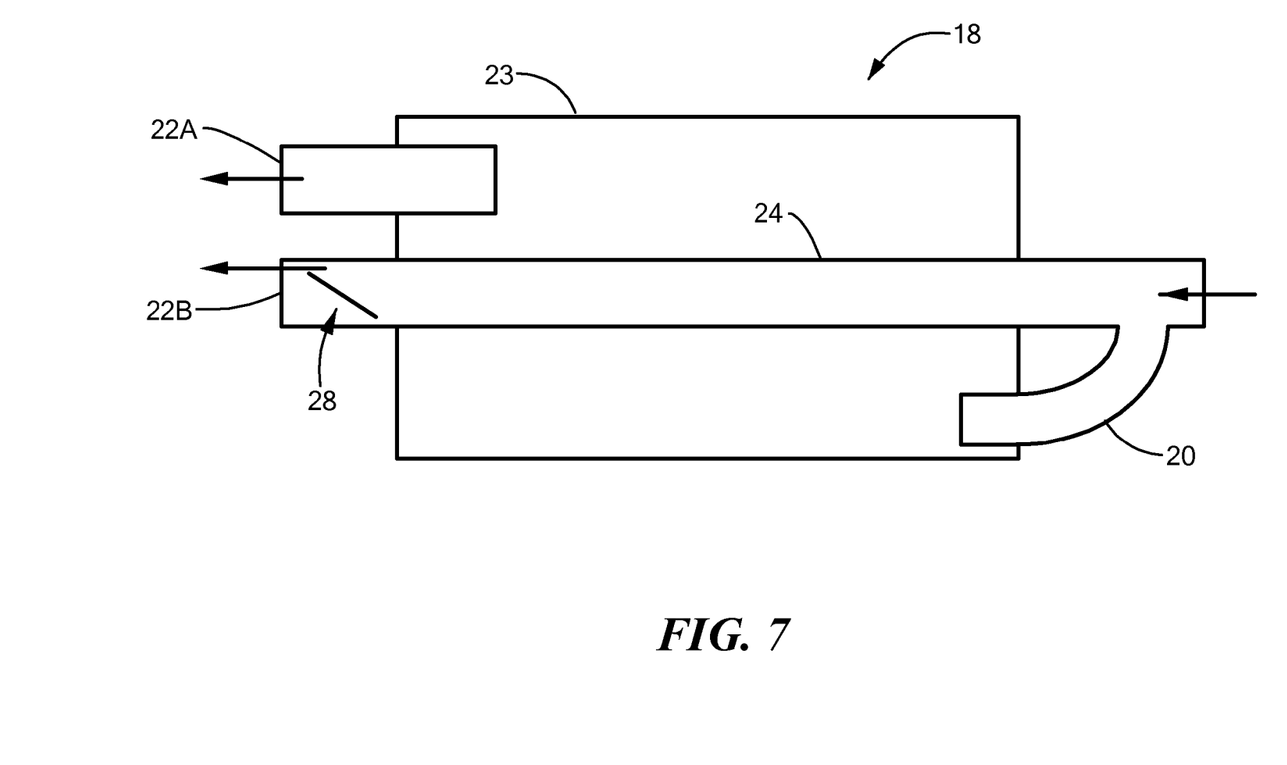
FIG. 7 schematically shows an exhaust system configured in a manner similar to that of FIG. 6, but with the intersection of the two exhaust paths external to the muffler housing.
Figure 8:
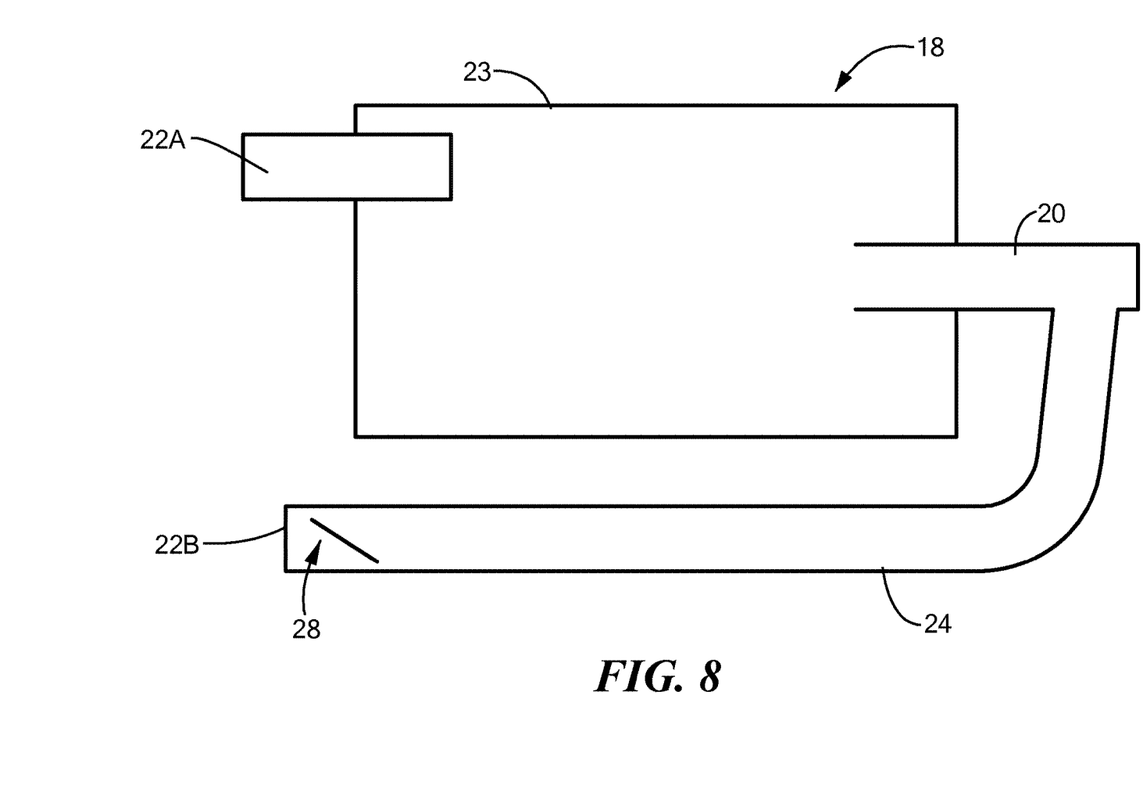
FIG. 8 schematically shows an exhaust system configured in a manner similar to that of FIG. 7 and FIG. 1.

FIGS. 6-8 show three additional examples of the exhaust system configuration. Specifically, as noted, illustrative embodiments of the bypass channel 24 provide little or no muffling of the output sound. Despite that, as the embodiments of FIGS. 6-8 show, the bypass channel 24 still may pass through the muffler housing, but bypass its muffling function. Accordingly, the bypass channel 24 in that case still may be considered to bypass the muffler 23.

To that end, FIG. 6 schematically shows a dual exhaust system 18 in which the bypass channel 24 extends straight through the muffler housing. Specifically, the main pipe 20 extends into the muffler housing. Before reaching substantial muffling functionality, however, the main pipe 20 meets the bypass channel 24 within the muffler housing. In this example, the bypass channel 24 actually is generally co-axial with the upstream part of the main pipe 20 that enters the muffler housing. At that point, the bypass channel 24 and main pipe 20 diverge/split into two paths. In particular, the main pipe 20 diverges from its original path and into the muffling functionality of the muffler 23. The output from the main pipe 20 thus expels exhaust gas into the environment via the top tail pipe 22A (although not shown as connecting, there is a connection through the muffler 23). The bypass channel 24, however, expels exhaust gas into the environment through the lower tail pipe 22B. The valve 28, which controls fluid flow through the bypass channel 24, preferably is at or near the end of the bypass channel 24 nearest to its tail pipe 22B. Some embodiments, however, may position the valve 28 more upstream in the bypass channel 24, such as at or near the intersection of the two flow paths.

FIG. 7 schematically shows a similar embodiment to that of FIG. 6. The primary difference is that the system of FIG. 7 splits the two exhaust paths 20 and 24 upstream of the muffler housing—i.e., outside of the muffler housing. FIG. 8 shows yet another embodiment similar to that of FIG. 1 with the bypass channel 24 entirely avoiding the muffler housing, but also similar to that of FIGS. 6 and 7 by using a dual tail pipe 22 approach.

As discussed above, the vehicle preferably includes the automobile 10, such as a sports car (e.g., a Roush™ Mustang™). Other embodiments, however, relate to other types of vehicles, such as aircraft, boats, motorcycles, all-terrain vehicles, trucks, and other motorized vehicles. The vehicle implementing various embodiments may be supplied directly from the factory with the optimized functionality.

Various after-market providers alternatively may upgrade conventional cars to include the noted motor sound control. To that end, such providers may use a kit having a number of different components that are applied to the automobile 10. Among other things, those components may include the bypass channel 24 (e.g., a pipe or other device configured to withstand high temperatures), the valve 28 and its related motion controlling hardware/software (e.g., the pulse-width-modulation functionality), the switch 32 or similar switching device, code implementing the user and/or provider modalities, and hardware (e.g., logic and memory) and/or code implementing the valve controller 30.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. An exhaust management system for use in a motor vehicle having a muffler coupled with a tail pipe and for use with a combustion engine generating an exhaust through the tail pipe, the system comprising:

a bypass channel configured to be mounted to bypass the muffler, the bypass channel being an unmuffled pipe configured to allow flow of exhaust from the combustion engine;

a valve configured for controlling exhaust flow through the bypass channel; and a controller operably coupled with the valve, the controller being configured to be switchable between at least two modes, the at least two modes comprising:

a static mode that controls valve movement in response to user selection and independently of any dynamic parameters of the motor vehicle; and a dynamic mode in which the valve is movable in response to at least one dynamic parameter of the motor vehicle, the controller being configured to control the movement of the valve about a plurality of positions including and between an open mode and a closed mode as a function of the at least one dynamic parameter of the motor vehicle when in the dynamic mode, the controller configured to permit the valve to be in a position that is at least partly open at certain times when in the dynamic mode, the bypass channel configured to increase loudness of sound from the tail pipe as the valve allows exhaust flow through the bypass channel.

2. The system as defined by claim 1 wherein the at least one dynamic parameter can vary during operation of the motor vehicle.

3. The system as defined by claim 1 further comprising a switch operably coupled with the controller, the switch being alternatively switchable between the static mode and the dynamic mode.

4. The system as defined by claim 1 wherein memory stores dynamic valve positional information relating to the dynamic mode, the system further comprising code for generating a graphical user interface operably coupled with the controller, the graphical user interface being configured to change the dynamic valve positional information stored in the memory based on user interaction with the graphical user interface.

5. The system as defined by claim 1 wherein the motor vehicle has a throttle and is configured to operate at a plurality of speeds, the at least one dynamic parameter comprising at least one of a throttle position of the throttle of the motor vehicle and a speed of the plurality of speeds of the motor vehicle.

6. The system as defined by claim 1 wherein the dynamic mode comprises a provider dynamic mode configured to be modified by a provider modality only.

7. The system as defined by claim 6 wherein the dynamic mode comprises a user dynamic mode configured to be modified by a user modality, the user modality being unable to modify the provider dynamic mode.

8. The system as defined by claim 1 wherein the vehicle has a transmission system, further wherein the at least one dynamic parameter comprises at least one of throttle position, speed of the vehicle, load on the combustion engine, RPM of the combustion engine, gear of the transmission system, a position of the vehicle in its environment, and a local time.

9. The system as defined by claim 1 wherein the controller is configured to access a look-up-table when in the dynamic mode, the controller using the at least one dynamic parameter to determine a valve setting, based on the look-up table, when in the dynamic mode, the controller controlling the valve based on the valve setting.

10. The system as defined by claim 1 wherein the controller is configured to transmit, when in the dynamic mode, a pulse width modulated signal to the valve after receiving information relating to the at least one dynamic parameter.

11. The system as defined by claim 1 further comprising the muffler, the bypass channel being connected about the muffler.

12. The system as defined by claim 1 wherein the controller is configured to switch to a quiet mode upon receipt of a phone call or message by the motor vehicle, the controller configured to close the valve in the quiet mode.

13. The system as defined by claim 1 wherein the controller is configured to control the movement of the valve in a plurality of positions between the open mode and the closed mode as a function of user selection in the static mode.

14. The system as defined by claim 1 wherein the controller is configured to switch to an override mode depending on a local time of the motor vehicle, the controller configured to close the valve in the override mode.

15. The system as defined by claim 1 wherein the controller is configured to switch to an override mode depending on a geographic position of the motor vehicle, the controller configured to close the valve in the override mode.

16. The system as defined by claim 1 wherein the controller is configured to switch to a quiet mode upon receipt of a phone call or message by the motor vehicle, the controller configured to close the valve in the quiet mode.

17. The system as defined by claim 1 wherein the controller is configured to switch to an override mode depending on a local time of the motor vehicle, the controller configured to close the valve in the override mode.

18. The system as defined by claim 1 wherein the controller is configured to switch to an override mode depending on a geographic position of the motor vehicle, the controller configured to close the valve in the override mode.

19. An exhaust management kit for use in a motor vehicle having a muffler coupled with a tail pipe and for use with a combustion engine generating an exhaust through the tail pipe, the kit comprising:
　a bypass channel configured to be mountable to bypass the muffler, the bypass channel being an unmuffled pipe configured to allow flow of exhaust from the combustion engine;
　a valve configured to be mountable to control exhaust flow through the bypass channel; and
　a controller configured to be switchable between at least two modes when operably coupled with the valve, the at least two modes comprising:
　　a static mode that controls valve movement in response to user selection and independently of any dynamic parameters of the motor vehicle; and
　　a dynamic mode in which the valve is movable in response to at least one dynamic parameter of the motor vehicle,
　the controller being configured to control the movement of the valve about a plurality of positions between an open mode and a closed mode as a function of the at least one dynamic parameter of the motor vehicle when in the dynamic mode,
　the controller configured to permit the valve to be in a position that is at least partly open at certain times when in the dynamic mode,
　the bypass channel configured to increase loudness of sound from the tail pipe as the valve allows exhaust flow through the bypass channel.

20. The kit as defined by claim 19 further comprising a switch operably coupled with the controller, the switch being alternatively switchable between the static mode and the dynamic mode.

21. The kit as defined by claim 19 wherein memory stores valve positional information relating to the dynamic mode, the kit further comprising code for generating a graphical user interface operably coupled with the controller, the graphical user interface being configured to change the information stored in the memory based on user interaction with the graphical user interface.

22. The kit as defined by claim 19 wherein the motor vehicle has a throttle and is configured to operate at a plurality of speeds, the at least one dynamic parameter comprising at least one of a throttle position of the throttle of the motor vehicle and a speed of the plurality of speeds of the motor vehicle.

23. The kit as defined by claim 19 wherein the dynamic mode comprises a provider dynamic mode configured to be modified by a provider modality only.

24. The kit as defined by claim 23 wherein the dynamic mode comprises a user dynamic mode configured to be modified by a user modality, the user modality being unable to modify the provider dynamic mode.

25. The kit as defined by claim 19 wherein the controller is configured to switch to a quiet mode upon receipt of a phone call or message by the motor vehicle, the controller configured to close the valve in the quiet mode.

26. The kit as defined by claim 19 wherein the controller is configured to control the movement of the valve about in a plurality of positions between the open mode and the closed mode as a function of user selection in the static mode.

27. The kit as defined by claim 19 wherein the controller is configured to switch to an override mode depending on a local time of the motor vehicle, the controller configured to close the valve in the override mode.

28. The kit as defined by claim 19 wherein the controller is configured to switch to an override mode depending on a geographic position of the motor vehicle, the controller configured to close the valve in the override mode.

29. An exhaust management system for use in a motor vehicle having a muffler coupled with a tail pipe and for use with a combustion engine generating an exhaust through the tail pipe, the system comprising:
   a bypass channel configured to be mounted to bypass the muffler, the bypass channel being an unmuffled pipe configured to allow flow of exhaust from the combustion engine;
   a valve controlling exhaust flow through the bypass channel; and
   a controller operably coupled with the valve, the controller being configured to be switchable between at least two modes, the at least two modes comprising:
      a provider dynamic mode configured to be modified by a provider modality only; and
      a user dynamic mode configured to be modified by a user modality, the user modality being unable to modify the provider dynamic mode,
   the provider and user dynamic modes being configured to control movement of the valve in response to at least one dynamic parameter of the motor vehicle,
   the controller being configured to control the movement of the valve about a plurality of positions between an open mode and a closed mode as a function of the at least one dynamic parameter of the motor vehicle when in the provider or user dynamic modes,
   the controller configured to permit the valve to be in a position that is at least partly open at certain times when in the dynamic mode,
   the bypass channel configured to increase loudness of sound from the tail pipe as the valve allows exhaust flow through the bypass channel.

30. The system as defined by claim 29 wherein the provider modality comprises provider computer program code requiring provider authentication information relating to a provider.

31. The system as defined by claim 29 wherein the user modality comprises user computer program code requiring user authentication information relating to a user.

32. The system as defined by claim 29 wherein the controller comprises memory for storing data for the provider dynamic mode, the memory being read-only memory.

33. The system as defined by claim 29 wherein the controller also is switchable to a static mode that operates in response to user selection and independently of the at least one dynamic parameter of the motor vehicle.

34. The system as defined by claim 29 wherein memory stores valve positional information relating to the dynamic modes, the system further comprising a graphical user interface operably coupled with the controller, the graphical user interface being configured to change the positional information stored in the memory relating to the user dynamic mode based on user interaction with the graphical user interface.

\* \* \* \* \*